United States Patent [19]

Takei

[11] Patent Number: 5,473,992
[45] Date of Patent: Dec. 12, 1995

[54] BRAKING APPARATUS AND A DRIVE UNIT EQUIPPED WITH SAID APPARATUS AND A LINEAR MOTOR

[75] Inventor: Seiji Takei, Kanagawa, Japan

[73] Assignee: Nippon Thompson Co., Ltd., Tokyo, Japan

[21] Appl. No.: 247,551

[22] Filed: May 23, 1994

[30] Foreign Application Priority Data

Jun. 8, 1993 [JP] Japan ................................. 5-163272

[51] Int. Cl.[6] .............................. B60L 13/00; B61H 13/00
[52] U.S. Cl. .............................. 104/290; 188/36; 414/749
[58] Field of Search ................................ 188/36, 75, 136, 188/343, 382; 414/749; 104/290

[56] References Cited

U.S. PATENT DOCUMENTS

| | | | |
|---|---|---|---|
| 550,962 | 12/1895 | Gibbons | 188/36 |
| 2,555,651 | 6/1951 | Lambert et al. | 188/136 |
| 4,800,818 | 1/1989 | Kawaguchi et al. | 104/290 |

FOREIGN PATENT DOCUMENTS

20213 of 1901 United Kingdom ..................... 188/36

Primary Examiner—Robert J. Oberleitner
Assistant Examiner—Kevin D. Rutherford
Attorney, Agent, or Firm—Sughrue, Mion, Zinn, Macpeak & Seas; Richard C. Turner; Marc Kaufman

[57] ABSTRACT

A small braking apparatus, which is able to completely and suddenly stop a moving portion such as a linear direct current motor at a desired location, is described, together with a drive unit equipped with the braking apparatus. The braking effect is obtained by providing a rotary member on a slider to move along a long guiding member, and providing a driving device which causes a braking member, which performs a braking action by engaging with said rotary member, to engage and move away from said rotary member.

5 Claims, 8 Drawing Sheets

BRAKING APPARATUS AND A DRIVE UNIT EQUIPPED WITH SAID APPARATUS AND A LINEAR MOTOR

BACKGROUND OF THE INVENTION

1. Field of the Invention

The present invention relates to a drive unit equipped on a motion mechanism such as, for example, a machine tool or industrial robot, which moves an object to be moved with high accuracy, and a suitable braking apparatus provided on said drive unit.

2. Description of the Prior Art

Figure 1:
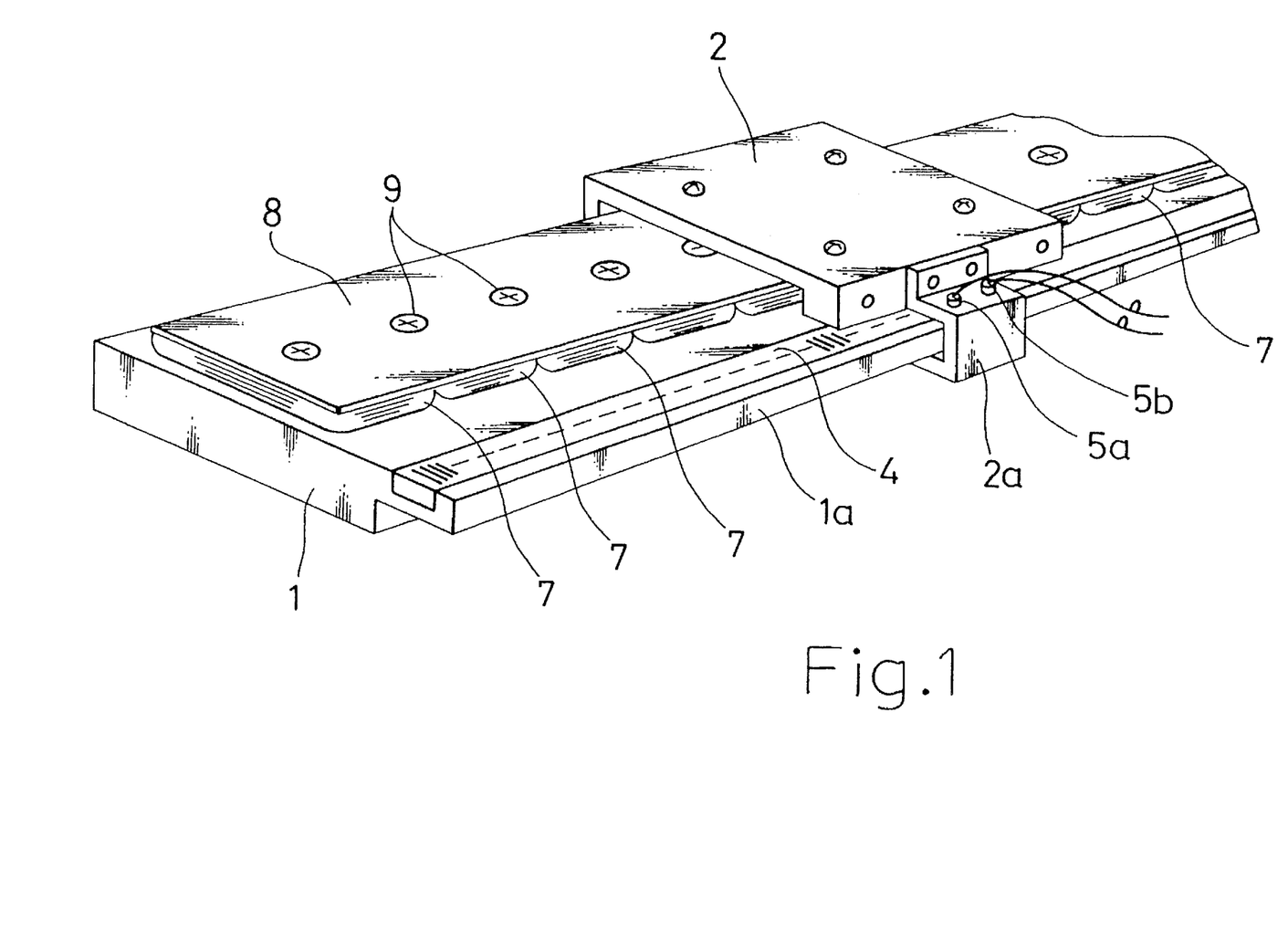
FIG. 1 is a perspective view of a drive unit of the prior art.

An example of this type of drive unit of the prior art is shown in FIG. 1.

As shown in the drawing, this drive unit has a guiding device comprising a long base member 1 acting as a guiding member, and a slider in the form of moving body 2 which moves along said base member 1. More specifically, a plurality of rollers (not shown) are provided in moving body 2, and these rollers roll over a track formed along the lengthwise direction in base member 1.

Overhang 1a is formed on one side of base member 1, and a detected element in the form of linear scale 4 is provided on said overhang 1a roughly over its entire length. In contrast, small bracket 2a is provided on the side of moving body 2, and detection elements in the form of light emitting element 5a and light receiving element 5b are mounted on said small bracket 2a. This linear scale 4, light emitting element 5a and light receiving element 5b compose a position detection device for detecting the position of moving body 2 with respect to a track rail in the form of base member 1.

On the other hand, a direct current linear motor, which composes a drive unit together with the above-mentioned guiding device, is composed in the manner described below.

As shown in the drawing, said direct current linear motor is composed of a primary side equipped with a large number of armature coils 7, arranged in a row on base member 1 in the lengthwise direction of said base member 1, and a secondary side having a field magnet (not shown) attached to the bottom surface of moving body 2 to oppose each of said armature coils 7. Each armature coil 7 is wound into the shape of a rectangular loop, attached to coil substrate 8, and fastened together with said coil substrate 8 to base member 1 by screws 9. In addition, the above-mentioned field magnet is magnetized by alternately arranging a plurality of N and S magnetic poles along the direction in which moving 2 is to move, namely the lengthwise direction of base member 1.

In the above-mentioned drive unit, by supplying a prescribed current to armature coils 7, thrust is produced based on Fleming's right hand rule between the primary and secondary sides. For example, if base member 1, to which the primary side is coupled, is taken to be the stationary side, moving body 2 integrated into a single unit with the secondary side is moved by this thrust. The position of moving body 2 with respect to base member 1 is then detected by the position detection device previously described.

The drive unit having the constitution described above is able to move and position a moving portion consisting of the secondary side of a linear direct current motor and a moving body 2 and so forth to a desired position with high accuracy. However, since said positioned moving portion only stops using magnetic force for the braking force, it is unstable under conditions such as being subjected to vibrations and so forth from the outside, thus having the disadvantage of it being difficult to stop without making fine movements to the prescribed position. In addition, since braking by magnetic force acts relatively slowly with respect to the inertia of the moving portion, this unit has the disadvantage of being unable to stop suddenly even when so required. In addition, in the case electrical power was to be cut off during operation of the drive unit caused by a power outage and so forth, since the moving portion would travel by inertia without any action of braking force whatsoever, it is necessary to stop said drive unit immediately in order to avoid collision with other equipment and so forth.

SUMMARY OF THE INVENTION

In consideration of the above-mentioned disadvantages of the prior art, the object of the present invention is to provide a small braking apparatus able to completely and immediately stop a moving portion equipped on a drive unit and so forth at a desired location, and a drive unit equipped with said braking apparatus.

The braking apparatus according to the present invention is composed of a rotary member provided so as to move along a long guiding member on a slider able to freely perform relative motion with respect to said guiding member; a braking member provided to move freely between a braking action location at which said braking member engages with said rotary member on said slider, and a non-braking action location at which said braking member releases from said braking action location; and, a driving device which moves said braking member.

In addition, the present invention consists of a drive unit, which mutually couples a long guiding member and slider able to freely perform relative motion with the primary side and secondary side each of a linear motor, provided with a braking apparatus which performs braking action on the relative motion of said guiding member and said slider, said braking apparatus comprising: a rotary member provided so as to move along a long guiding member on a slider able to freely perform relative motion with respect to said guiding member; a braking member provided to move freely between a braking action location at which said braking member engages with said rotary member on said slider, and a non-braking action location at which said braking member releases from said braking action location; and, a driving device which moves said braking member.

DESCRIPTION OF THE PREFERRED EMBODIMENTS

The following provides an explanation of the braking apparatus and the drive unit on which it is equipped as embodiments of the present invention with reference to the drawings. Furthermore, the linear motor included in the drive unit as claimed in the present invention is a linear direct current motor, and in this case, is of the moving magnet type. In addition, in the explanation of the present embodiment, the primary side of said linear direct current motor is taken to be the power supply side or stationary side, while the secondary side is taken to be the moving side.

To begin with, the following provides an explanation of the guiding device which performs mutual guidance of these primary and secondary sides.

Figure 2:
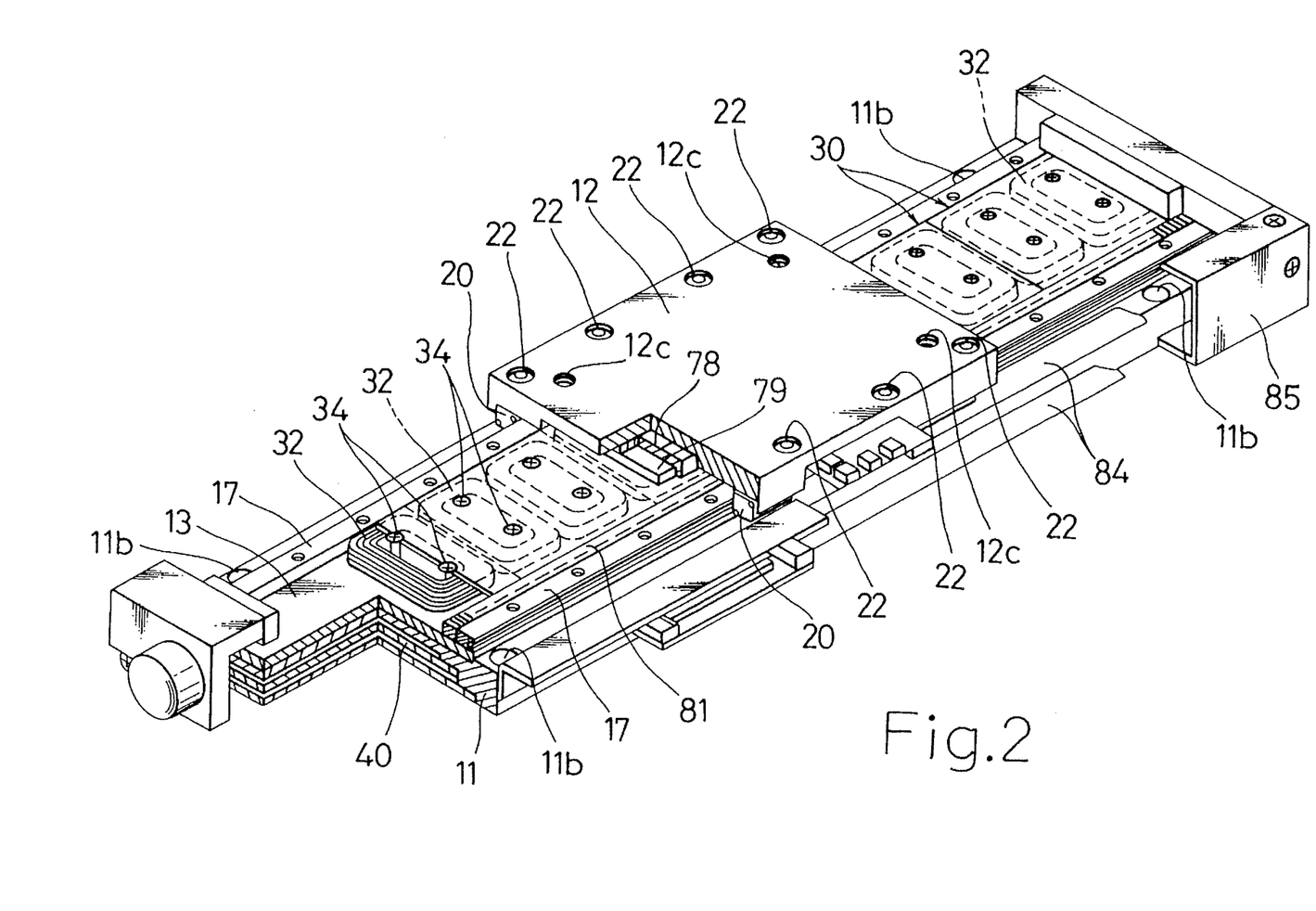
FIG. 2 is a perspective view including a partial cross-section of the drive unit as claimed in the present invention.
Figure 3:
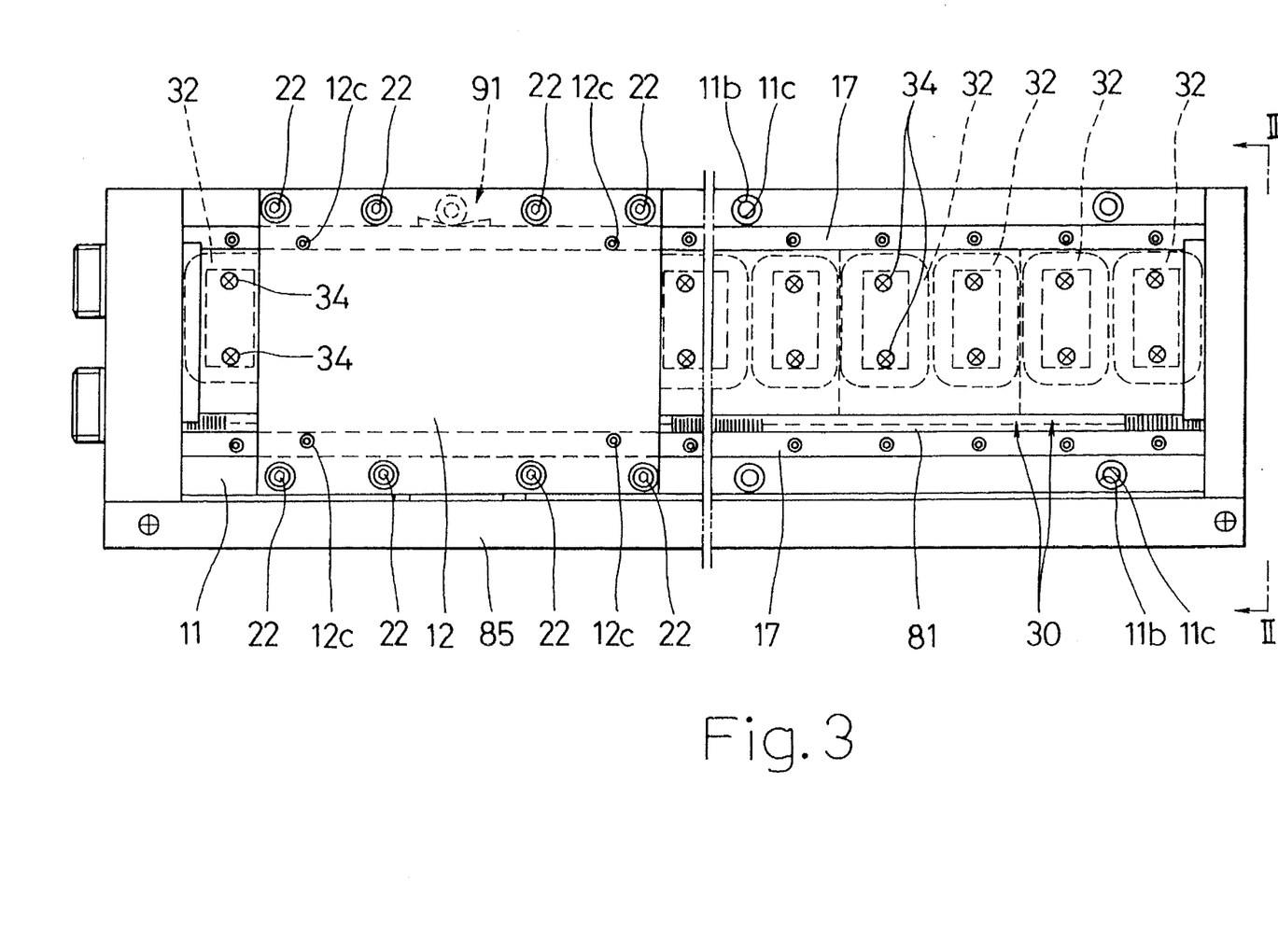
FIG. 3 is an overhead view of the drive unit shown in FIG. 2.
Figure 4:
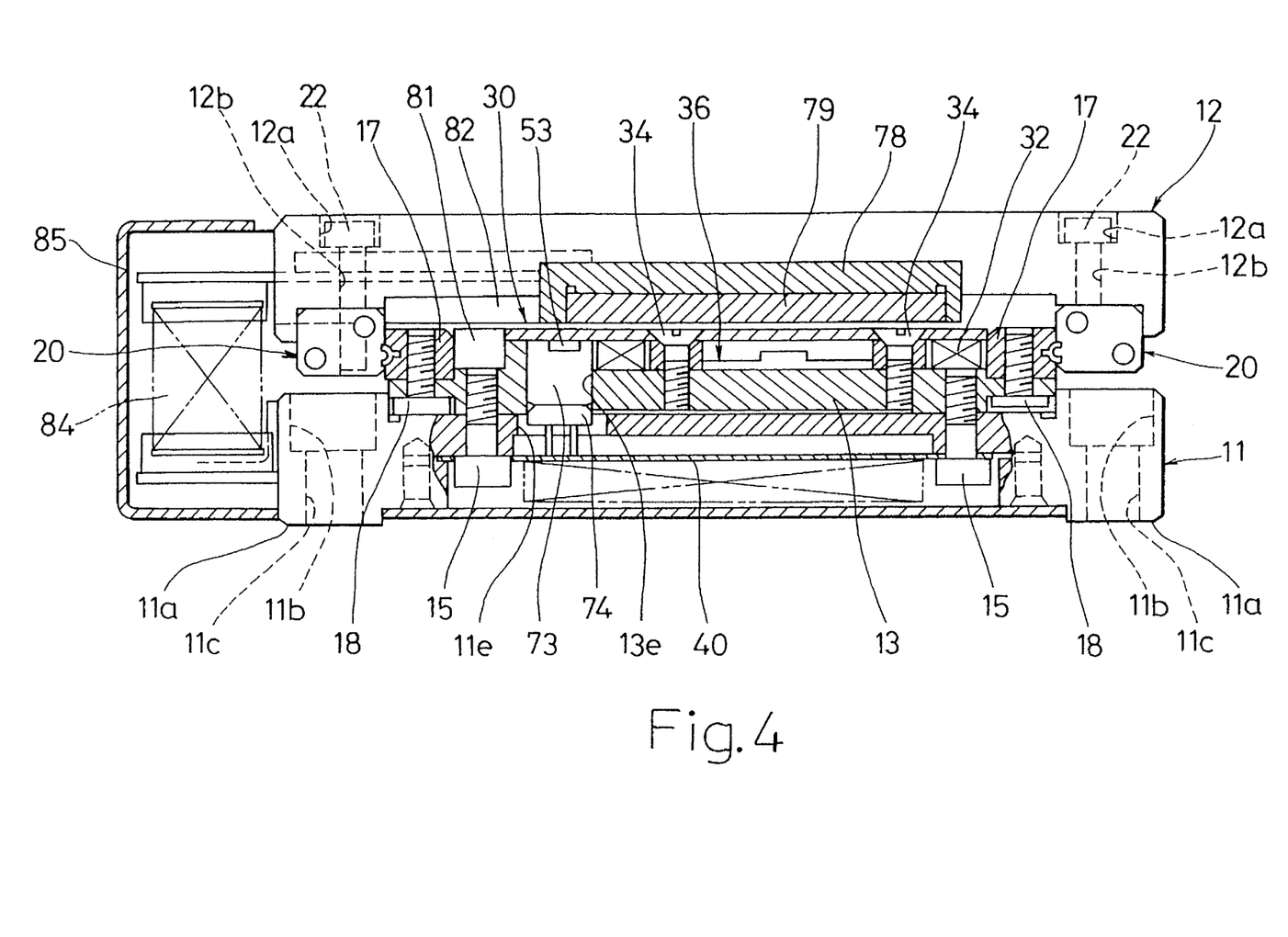
FIG. 4 is a view including a partial cross-section taken in the direction of arrows II—II relating to FIG. 3.

As shown in FIGS. 2 through 4, this guiding device has a bed 11 formed roughly into the overall shape of, for example, a rectangle, and table 12 to move in the lengthwise direction of said bed 11. As shown in FIGS. 2 through 4, coil yoke 13, formed into roughly a rectangular shape and having nearly the same length as bed 11, is arranged on the upper surface of said bed 11, and is fastened to said bed 11 by a plurality of bolts (with hexagon sockets, see FIG. 4) 15.

Two long guiding members in the form of track rails 17 are arranged on both sides of the upper surface of said coil yoke 13 along the lengthwise direction of said coil yoke 13, and are fastened to said coil yoke 13 by a plurality of countersunk head screws 28 (see FIG. 4).

Figure 5:
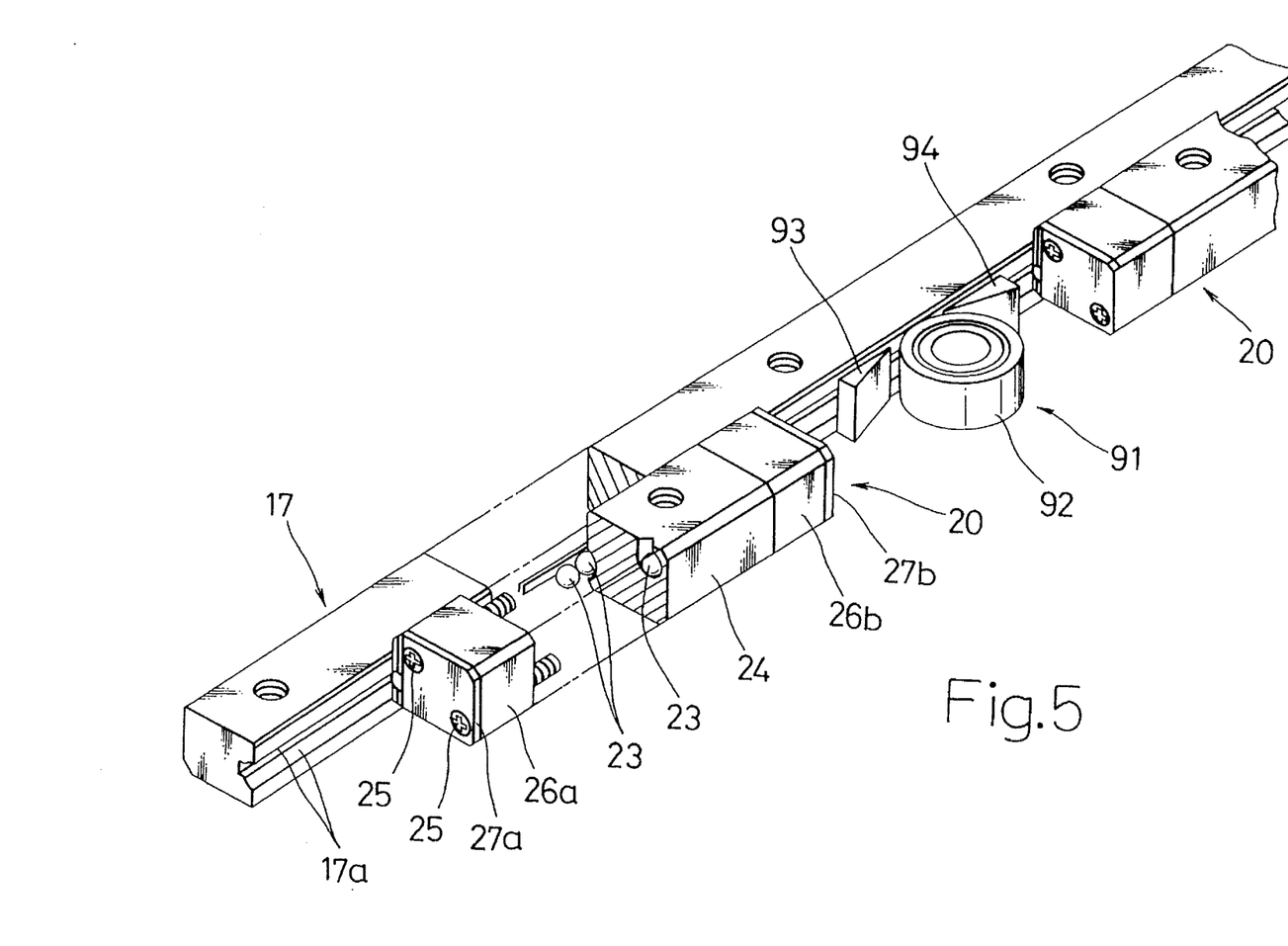
FIG. 5 is a perspective view including a partial cross-section of a track rail, slide member and control apparatus equipped on the drive unit shown in FIGS. 2 through 4.

As shown in FIG. 5, a track in the form of a single track groove 17a having a roughly semi-circular shaped cross-section is formed in the outside of the above-mentioned track rail 17. As is clear from FIGS. 2 and 4, a slider in the form of slide member 20, able to freely perform relative motion with respect to said track rail 17, is arranged on the outside of said track rail 17, and is fastened to the lower surface of table 12 by bolts (with hexagon heads) 22. Furthermore, as shown in FIG. 4, countersunk portions 12a and insertion holes 12b are formed in table 12 into which the head portions and threaded portions, respectively, of bolts 22 are inserted. Bolts 22 are embedded in these countersunk portions 12a and insertion holes 12b, and do not protrude from the upper surface of table 12. In addition, as is clear from FIG. 5, two of the above-mentioned slide member 20 are provided on a single track rail 17.

As shown in FIG. 5, a rolling element circulating path (not shown) is formed in the above-mentioned slide member 20, and rolling elements in the form of a large number of balls 23 are arranged and contained within said rolling element circulating path. These balls 23 bear the load between track rail 17 and slide member 20 by circulating while rolling over track groove 17a of track rail 17 accompanying movement of slide member 20 with respect to track rail 17.

As shown in FIG. 5, the above-mentioned slide member 20 has casing 24, a pair of end caps 26a and 26b coupled to both ends of said casing 24 by countersunk head screws 25, and two seals 27a and 27b fastened to the outer surfaces of both of said end caps 26a and 26b. The above-mentioned rolling element circulating path is composed of a load bearing track groove and return path formed mutually in parallel and passing linearly through casing 24, and a pair of roughly arc-shaped direction changing paths formed in both end caps 26a and 26b which connect both ends of said load bearing track groove and return path. Furthermore, said load bearing track groove opposes track groove 17a of track rail 17.

The guiding device of the constitution described above is fastened to a flat mounting surface equipped on, for example, a machine tool (not shown) by a plurality of bolts (with hexagon sockets, not shown). Consequently, as shown in FIG. 4, bed 21 has flat mounting bottom surface 11a for anchoring said bed 11 to said mounting surface. As shown in FIGS. 2 through 4, countersunk portions 11b and insertion holes 11c are formed in both sides of bed 11 into which the head portions and threaded portions of the above-mentioned bolts for fastening said bed are respectively inserted. Said bolts are embedded in these countersunk portions 11b and insertion holes 11c, and do not protrude from the upper surface of bed 11. In addition, as shown in FIGS. 2 and 3, for example, four threaded holes 12c are formed in the four corners of the upper surface of table 12 able to move with respect to this bed 11, and a table (not shown) equipped on an apparatus on which said drive unit is equipped is fastened to said table 12 by bolts (not shown) screwed into these threaded holes 12c.

Continuing, the following provides a detailed description of the primary and secondary sides of the linear direct current motor which are mutually guided by the guiding device having the constitution described above.

To begin with, as shown in FIGS. 2 through 4, the primary side has the previously described coil yoke 13 installed on bed 11, coil substrate 30 arranged along the lengthwise direction of said coil yoke 23 on the upper surface of said coil yoke, and, for example, 14 armature coils 32 supported by being affixed in a row in the direction in which the above-mentioned table 12 is to move on the lower surface of said coil substrate 30, namely the side of coil yoke 13. Furthermore, each armature coil 32 is wound into roughly the shape of a rectangular loop. In addition, as shown in FIG. 4, Hall effect elements 53 are provided corresponding to each armature coil 32 on coil substrate 30.

Each of the above-mentioned armature coils 32 and coil substrate 30 are fastened together to coil yoke 13 to the outside of said coil substrate 30 by fastening members in the form of countersunk head screws 34, for example, two each of which are inserted for each of said armature coils 32.

As shown in FIG. 4, spacer assemblies 36 are juxtaposed between coil substrate 30 fastened by countersunk head screws 34 and coil yoke 13 into which said countersunk head screws 34 are screwed. These spacer assemblies 36 are provided to prevent deformation such as warping and so forth of coil substrate 30 caused by tightening of countersunk head screws 34, and are fit inside each armature coil 32.

As shown in FIGS. 2 and 4, circuit substrate 40, for performing supply of electrical power and so forth to each of the above-mentioned armature coils 32, is arranged in parallel with coil substrate 30 on the lower surface of bed 11 on which said coil substrate 30 is installed on its upper surface with coil yoke 13 in between. Moreover, said circuit substrate 40 is fastened to said base member 11 by a plurality of bolts (with hexagon sockets) 15. Furthermore, these bolts 15 also fastens the above-mentioned coil yoke 13 to bed 11.

Furthermore, as shown in FIG. 4, coil substrate 30 and circuit substrate 40, which are arranged to be mutually separated by bed 11 and coil yoke 13, are connected by connecting corresponding male and female connectors 73 and 74 provided on mutually opposing sides of both said substrates. These connectors 73 and 74 are mutually connected through apertures 11e and 13e formed in bed 11 and coil yoke 13.

On the other hand, the secondary side is composed in the manner described below.

Figure 6:
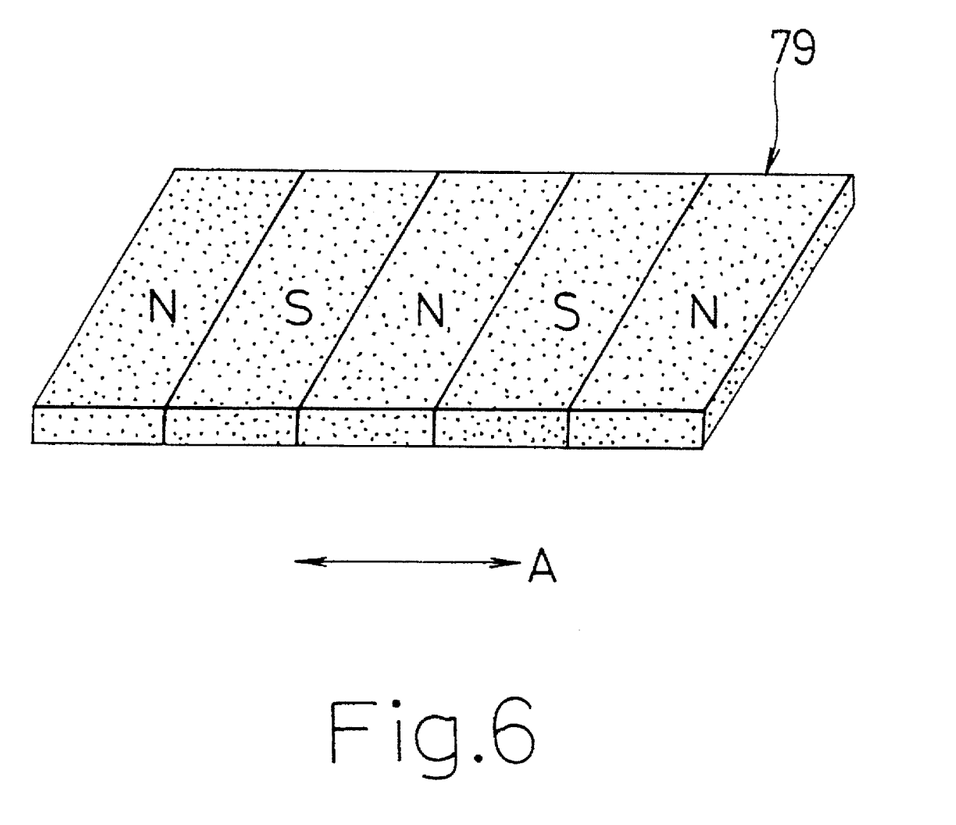
FIG. 6 is a perspective view of a field magnet which is a constituent member of the secondary side of a linear direct current motor included in the drive unit shown in FIGS. 2 through 4.

As shown in FIGS. 2 and 4, said secondary side has magnet yoke 78, mounted on the lower side of table 12, and field magnet 79 anchored on the lower surface of said magnet yoke 78 to oppose each of the above-mentioned armature coils 32 of the primary side. As shown in FIG. 6, the overall shape of field magnet 79 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 11.

In said drive unit, a detection device having the constitution described below is provided for detection of the relative positions of the above-mentioned bed 11 and table 12, namely the relative positions of track rail 17 and slide member 20.

Namely, said position detection device is composed of linear magnetic scale 81 shown in FIGS. 2 through 4, and magnetic sensor portion 82 shown in FIG. 4. Said linear magnetic scale 81 extends in the direction of movement of the above-mentioned table 12, and together with a large number of N and S magnetic poles alternately magnetized at a minute pitch along its lengthwise direction, an origin signal magnetized portion is formed at one end. Together with providing a Hall effect element for origin detection at magnetic sensor portion 82, another two A phase and B phase Hall effect elements are alternately arranged shifted by ½ the above-mentioned pitch. As a result of having said constitution, A phase and B phase signals are obtained thereby allowing detection of relative position along with assessment of direction of movement.

Furthermore, as is shown in FIGS. 2 through 4, cables 84 for obtaining signals from the above-mentioned magnetic sensor portion 82, and cover 85, which covers said cables 84, are provided. Said cables 84 consist of flexible substrates.

In the drive unit having the above-mentioned constitution, by supplying a prescribed current to armature coils 32, thrust is generated between the primary and secondary sides based on Fleming's right hand rule, and for example, if bed 11 and track rail 17 to which the primary side is coupled is taken to be the stationary side, table 12 and slide member 20, integrated into a single unit with the moving side, is moved by this thrust. Finally, relative position is detected by the position detection device described above.

A braking apparatus, which restricts the relative movement of the above-mentioned track rail 17 and slide member 20, namely the relative movement of bed 11 and table 12, is provided in said drive unit. The following provides an explanation of this braking apparatus.

Reference numeral 91 indicates this braking apparatus in FIGS. 3 and 5. As shown in the drawings, said braking apparatus 91 is provided corresponding to one of the 2 track rails 17 provided. More specifically, as is clear from FIG. 5, said braking apparatus 91 is arranged to the outside of said track rail 17 so as be positioned between slide members 20 to the front and rear.

Figure 7:
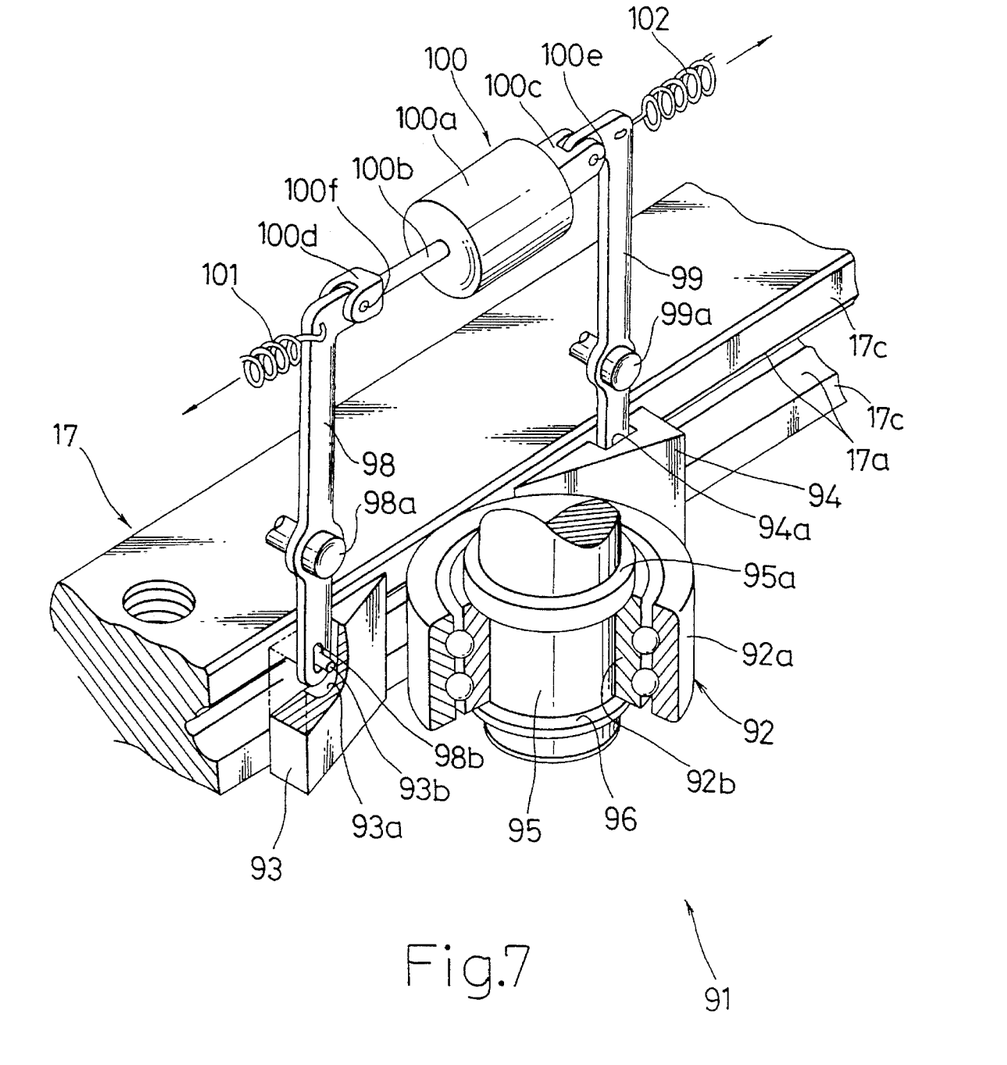
FIG. 7 is a perspective view including a partial cross-section of the braking apparatus and its peripheral members as claimed in the present invention.

Details of said braking apparatus 91 are shown in FIG. 7. As shown in the drawing, said braking apparatus 91 is composed of a rotary member in the form of radial bearing 92 arranged to make contact so as to roll along outer surface 17c of a long guiding member in the form of track rail 17, braking members in the form of a pair of wedge members 93 and 94, formed from a material such as steel or other metal, synthetic resin and so forth, which perform braking action by engaging with outer ring 92a of said radial bearing 92, and a driving device (to be described later) which drives said wedge members 93 and 94.

In this case, the above-mentioned radial bearing 92 is a ball bearing, and for example, that having a compound track is used. Said radial bearing 92 is attached to the above-mentioned table 12 (see FIGS. 2 through 4) by means of shaft 95 fit into its inner ring 92b. Furthermore, flange 95a is formed on said shaft 95 and retaining ring 96 is also fit onto said shaft 95. Movement of radial bearing 92 in the axial direction is restricted by flange 95a and retaining ring 96. Furthermore, various other types of radial bearings can naturally be used for the rotary member while taking into consideration the size of the load to be borne and the relationship with the dimensions of the peripheral members, and even ordinary rollers and so on can be used.

Figure 8:
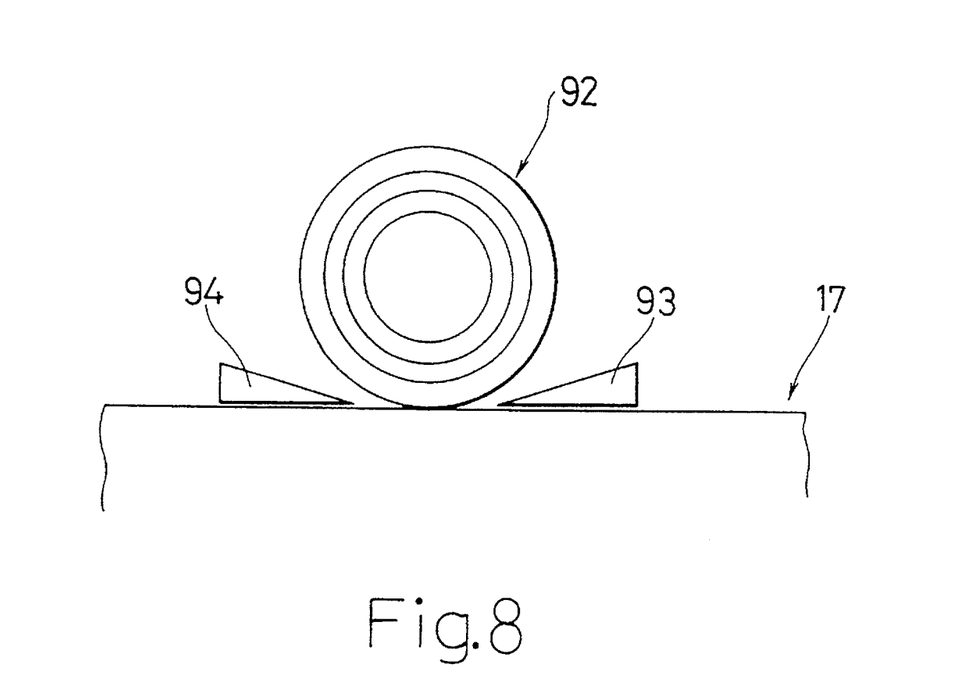
FIG. 8 is a schematic view explaining the operation of the braking apparatus shown in FIG. 7.
Figure 9:
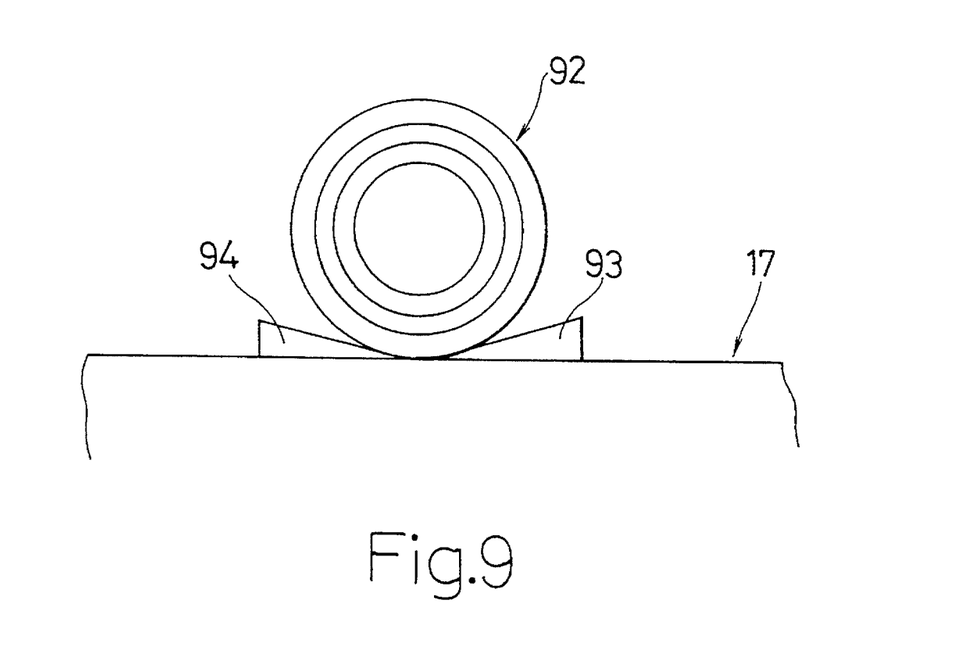
FIG. 9 is a schematic view explaining the operation of the braking apparatus shown in FIG. 7.

Both wedge members 93 and 94 described above are arranged so as to be positioned on both sides of the above-mentioned radial bearing 92 in the direction of relative movement of track rail 17 and slide member 20, and are allowed to move freely between a non-braking action location shown in FIGS. 7 and 8 and a braking action location shown in FIG. 9 as a result of being guided by a guiding device not shown. As is clear from FIG. 9, said braking action location refers to the location at which both wedge members 93 and 94 are juxtaposed between track rail 17 and radial bearing 92 resulting in wedging action, namely braking action. When both wedge members 93 and 94 are at this location, movement in both the forward and reverse directions of radial bearing 92 with respect to track rail 17 is restricted. In addition, the non-braking action location refers to the location at which both wedge members 93 and 94 are released from said braking action location resulting in cancellation of braking action.

Continuing, the following provides an explanation of the driving device which moves both the above-mentioned wedge members 93 and 94 between the above-mentioned braking action and non-braking action locations.

In FIG. 7, indentations 93a and 94a are each formed in both wedge members 93 and 94, and each of the bottom ends of a pair of lever members 98 and 99 provided extending in the vertical direction as constituent members of said driving device are inserted loosely into these indentations 93a and 94a. Both lever members 98 and 99 are attached to swing freely to table 12 (see FIGS. 2 through 4) by pins 98a and 99a near their bottom ends.

As shown in FIG. 7, slot 98b is formed along the lengthwise direction of lever member 98 in the bottom end of said lever member 98, and pin 93b protruding into indentation 93a of wedge member 93 fits into this slot 98b to slide freely. In addition, although not shown in the drawing, a similar slot is also formed in the bottom end of the other lever member 99, and a pin (not shown) embedded in indentation 94a of wedge member 94 fits into said slot to slide freely.

Solenoid plunger 100 is arranged between each of the top ends of both of the above-mentioned lever members 98 and 99. Furthermore, supply and interruption of power to said solenoid plunger 100 is performed through cables 84 shown in FIGS. 2 and 4. Small brackets 100c and 100d are each fixed on each end of body 100a and output rod 100b of said solenoid plunger 100, and each of the top ends of both of the above-mentioned lever members 98 and 99 are attached to these small brackets 100c and 100d by means of pins 100e and 100f.

More specifically, these pins 100e and 100f are fixed to small brackets 100c and 100d, and each fit into slots (not shown) formed in each of the top ends of lever members 98 and 99 while allowing to slide freely. Furthermore, each of said slots extend in the vertical direction in the same manner as slots 98b formed in the bottom end of each of said lever members 98 and 99.

Coil springs 101 and 102, which apply force to both of the above-mentioned lever members 98 and 99 in the direction in which said upper ends mutually move away, are connected to each of the upper ends of both of said lever members 98 and 99. Together with the above-mentioned solenoid plunger 100, both of said coil springs 101 and 102 compose a driving force generating device which generates driving force to be applied to both wedge members 93 and 94 serving as braking members.

However, a transmission mechanism, which transmits driving force from said driving force generating device to both wedge members 93 and 94, is equipped with lever members 98 and 99 as described above. These lever members 98 and 99 act as a doubling device which doubles the driving force generated by the above-mentioned driving force generating device. As a result of providing this type of doubling device, large braking force can be obtained even if the braking apparatus is small.

Next, the following provides an explanation of the operation of the braking apparatus having the above-mentioned constitution.

When a moving portion consisting of slide member 20 and table 12 installed on said slide member 20 is moved with respect to track rail 17 and reaches the vicinity of a desired location, braking is performed by magnetic force and said moving portion decelerates and stops at said location. During movement of this moving portion, power is supplied to solenoid plunger 100 shown in FIG. 7 and its output rod 100b is retracted. Accordingly, each wedge member 93 and 94 is at the non-braking action location shown in FIGS. 7 and 8. In addition, during movement of said moving portion, radial bearing 92 rolls along track rail 17.

Simultaneous to the above-mentioned moving portion stopping at the above-mentioned desired location, the supply of power to solenoid plunger 100 is cut off. Thus, in FIG. 7, each of lever members 98 and 99 are swung in the counter-clockwise and clockwise directions in the respective drawings by the force applied by coil springs 101 and 102, and as shown in FIG. 9, each of wedge members 93 and 94 move to the braking action location, namely juxtaposed between track rail 17 and radial bearing 92 to perform wedging action. Consequently, the moving portion stops completely and there is no fine movement even when subjected to external vibrations and so forth.

In addition to the above, in the case it is necessary to suddenly stop the above-mentioned moving portion during its movement, the power supplied to solenoid plunger 100 is cut off without performing braking by magnetic force. When performed in this manner, each of wedge members 93 and 94 immediately move to the above-mentioned braking action location resulting in braking and sudden stopping of the moving portion. At this time, the wedge member on the side in the direction of movement is pulled between track rail 17 and radial bearing 92 due to the rotation of radial bearing 92, causing braking force to act suddenly and resulting in immediate stopping. This constitution is particularly effective during power outages and so forth since the moving portion stops immediately when the supply of power to the linear direct current motor is interrupted, thus enabling collision with other equipment and so forth arranged around the periphery to be avoided.

Furthermore, although a moving magnet type of linear direct current motor, wherein the primary side containing armature coils 32 is taken to be the stationary side and the secondary side, namely field magnet 79, is taken to be the moving side, is shown in the above-mentioned embodiment, the present invention can also be applied to a moving coil type of linear direct current motor. In addition, the present invention can also be applied to linear motors other than linear direct current motors, and can be applied to apparatuses equipped with other actuators.

In addition, although braking apparatus 91 described above is attached to the lower surface of table 12 in the present embodiment, it may also be provided directly on slide member 20.

In addition, although said braking apparatus 91 is only provided on one side of table 12, it may also be provided on both sides, and the number provided may be suitably altered.

Moreover, although the present embodiment indicates the case of the braking members being in the form of wedge members 93 and 94, various other braking members can be used such as a system wherein braking members in the form of brake pieces frictionally engage with radial bearing 92.

In addition, the present invention can also be applied in other embodiments wherein bed 21 has a certain curvature and performs curved motion.

According to the present invention as explained above, since the present invention offers the advantage of being able to completely stop the moving portion at a desired location even under conditions of being subjected to external vibrations and so forth, and being able to stop said moving portion immediately when necessary, the braking apparatus itself is small thus requiring less installation space.

What is claimed is:

1. A linear motor drive unit, comprising; a long guiding member a slider movably coupled to said guiding member for relative linear motion, said guiding member and said slider being associated with a primary side and a secondary side of the linear motor, a braking apparatus which brakes the relative motion of said guiding member and said slider, said braking apparatus comprising: a rotary member provided so as to roll in continuous contact with said guiding member as said slider performs relative motion with respect to said guiding member; a braking member freely movable between a braking action location at which said braking member engages with said rotary member and a non-braking action location at which said braking member releases from said braking action location; and a driving device which actuates said braking member.

2. The apparatus as set forth in claim 1, wherein said braking member is comprised of a pair of wedge members arranged so as to be positioned on both sides of said rotary member in the direction of said linear motion, each of said wedge members performing a wedging action by being juxtaposed between said guiding member and said rotary member when at said braking action location.

3. The apparatus as set forth in claim 1, wherein said driving device includes a driving force generating device which generates driving force, and a transmission mechanism which transmits a driving force to said braking member, and a transmission mechanism including a doubling device which doubles said driving force, said braking member moving between said braking action location and said non-braking action location in response to said driving force.

4. The apparatus as set forth in claim 1, wherein said rotary member comprises a radial bearing, said bearing being attached to said slider at an inner ring thereof.

5. The drive unit as set forth in claim 1, wherein, when power to said linear motor is interrupted, said driving device moves said braking member to said braking action location.

* * * * *